US009992688B2

(12) United States Patent
Peng et al.

(10) Patent No.: US 9,992,688 B2
(45) Date of Patent: Jun. 5, 2018

(54) COMMUNICATION METHOD AND APPARATUS

(71) Applicant: Huawei Technologies Co., Ltd., Shenzhen (CN)

(72) Inventors: Yan Peng, Shanghai (CN); Hongrui Zhou, Kista (SE); Jing Yang, Shanghai (CN); Ni Ma, Shanghai (CN); Jianping Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 15/047,826

(22) Filed: Feb. 19, 2016

(65) Prior Publication Data

US 2016/0165458 A1    Jun. 9, 2016

Related U.S. Application Data

(63) Continuation of application No. PCT/CN2013/081898, filed on Aug. 20, 2013.

(51) Int. Cl.
*H04W 16/28* (2009.01)
*H04W 16/32* (2009.01)
*H04B 7/0413* (2017.01)
*H04B 7/06* (2006.01)
*H04B 7/0408* (2017.01)
*H04W 72/04* (2009.01)

(52) U.S. Cl.
CPC ......... *H04W 16/28* (2013.01); *H04B 7/0408* (2013.01); *H04B 7/0413* (2013.01); *H04B 7/0617* (2013.01); *H04W 16/32* (2013.01); *H04B 7/0626* (2013.01); *H04W 72/046* (2013.01)

(58) Field of Classification Search
None
See application file for complete search history.

(56) References Cited

U.S. PATENT DOCUMENTS

| 7,826,471 | B2 | 11/2010 | Wilson et al. |
| 8,116,822 | B1 | 2/2012 | Lo et al. |

(Continued)

FOREIGN PATENT DOCUMENTS

| CN | 1547333 A | 11/2004 |
| CN | 101243699 A | 8/2008 |

(Continued)

*Primary Examiner* — Brandon M Renner
(74) *Attorney, Agent, or Firm* — Slater Matsil, LLP

(57) ABSTRACT

According to a communication method and a base station that are provided in embodiments of the present invention, the base station transmits a broad beam that covers a sector of the base station and narrow beams whose coverage areas completely fall within a coverage area of the broad beam, which implements that under a premise that a coverage area of the sector of the base station maintains unchanged by using the broad beam, enhanced coverage of the sector is further achieved by using the narrow beams, thereby improving spectral efficiency. In the solutions, a sector coverage area of the broad beam transmitted by the base station still maintains unchanged, and therefore, a coverage relationship between sectors is not affected. In addition, neither an additional site backhaul resource nor additional standardization support is required in the solutions.

12 Claims, 6 Drawing Sheets

(56) References Cited

U.S. PATENT DOCUMENTS

| | | | |
|---|---|---|---|
| 8,295,228 B2 | 10/2012 | Tangemann | |
| 9,179,319 B2 | 11/2015 | Gore et al. | |
| 2008/0144596 A1* | 6/2008 | Dankberg | H04B 7/10 370/345 |
| 2008/0273515 A1* | 11/2008 | Stopler | H04W 72/046 370/344 |
| 2008/0311844 A1* | 12/2008 | Eidenschink | H04B 7/2041 455/3.02 |
| 2009/0225883 A1 | 9/2009 | Orlik et al. | |
| 2012/0320874 A1 | 12/2012 | Li et al. | |
| 2013/0059619 A1 | 3/2013 | Kim et al. | |
| 2013/0182594 A1 | 7/2013 | Kim et al. | |
| 2013/0194950 A1* | 8/2013 | Haghighat | H04W 24/02 370/252 |
| 2013/0301619 A1* | 11/2013 | Singh | H04W 56/004 370/336 |
| 2014/0192917 A1* | 7/2014 | Nam | H04B 7/0417 375/267 |
| 2015/0162966 A1* | 6/2015 | Kim | H04B 17/00 370/252 |

FOREIGN PATENT DOCUMENTS

| | | |
|---|---|---|
| CN | 101562817 A | 10/2009 |
| CN | 202406312 U | 8/2012 |
| EP | 1487227 A1 | 12/2004 |
| JP | 2008547283 A | 12/2008 |
| JP | 2010068519 A | 3/2010 |
| WO | 2006138581 A2 | 12/2006 |
| WO | 2013094980 A1 | 6/2013 |

* cited by examiner

COMMUNICATION METHOD AND APPARATUS

This application is a continuation of International Application No. PCT/CN2013/081898, filed on Aug. 20, 2013, which is hereby incorporated by reference in its entirety.

TECHNICAL FIELD

The present invention relates to the field of communications technologies, and in particular, to a communication method and apparatus.

BACKGROUND

With rapid development of the mobile Internet, explosive growth of a service volume continuously imposes a new demand on a mobile communications network, so that various new technologies emerge endlessly, such as an orthogonal frequency division multiplexing (OFDM) technology, a multi-antenna Multiple Input Multiple Output (MIMO) technology, a relay technology, a carrier aggregation (CA) technology, and a coordinated multi-point (CoMP) transmission technology. A common point of these new technologies lies in continuously pursuing improvement of spectral efficiency and a capacity of the mobile communications network.

From a theoretical analysis, a core of improving the spectral efficiency of the mobile communications network is to improve a signal to interference plus noise ratio. For example, this purpose may be achieved by using a technology such as interference coordination or power control. For improving the capacity of the mobile communications network, a relatively intuitive method is increasing an available resource of the mobile communications network. For example, direct improvement of the capacity of the mobile communications network can be achieved by increasing available bandwidth of the mobile communications network. With development of technologies, system bandwidth of the mobile communications network is also continuously improved. However, due to scarcity of a wireless spectrum resource, severe shortage of the spectrum resource has increasingly become a bottleneck of development of the wireless communications industry.

Based on the foregoing situation, in an existing situation of severe shortage of the spectrum resource, how to fully develop and use the limited spectrum resource and improve the spectral efficiency has become one of hot topics currently researched in the communications industry. A multi-antenna technology is widely favored because the multi-antenna technology can improve transmission efficiency without a need of increasing bandwidth. A principle of the technology lies in increasing a quantity of transmit antennas per unit physical area, so that a multiplexing degree of a time-frequency resource can be improved by fully using a channel characteristic without a need of increasing the bandwidth, thereby greatly improving the spectral efficiency. Specifically, after the multi-antenna technology is used, if enough differences of spatial sub-channels formed between antenna arrays of a transmit end and a receive end can be ensured, that different data flows are transmitted on different sub-channels can be implemented, so as to provide an additional spatial dimension besides a time domain and a frequency domain so that multiple users can share a same time, frequency, or code domain resource, thereby efficiently improving the spectral efficiency and the capacity. In the prior art, a heterogeneous network (HetNet), a distributed antenna system (DAS), a virtual multi-sector, an MIMO technology, and the like may be all considered as technologies that are based on the foregoing principle.

Currently, in the foregoing various prior arts in which the spectral efficiency is improved by increasing the quantity of antennas per unit area, there more or less exist defects such as a need of an additional site backhaul resource, impact on a coverage relationship between sectors, and a need of additional standardization support.

SUMMARY

Embodiments of the present invention provide a communication method and a base station, so that spectral efficiency can be improved under a premise that no additional site backhaul resource is required and a coverage relationship between sectors is also not affected.

The embodiments of the present invention use the following technical solutions:

According to a first aspect, a communication method is provided, including: determining, by a base station, that at least two narrow beams are used to transmit data to at least two terminals, where the base station transmits a broad beam and at least two narrow beams; and transmitting, by the base station, data to the at least two terminals on a same time-frequency resource by using the determined narrow beams; where the broad beam covers a sector of the base station, coverage areas of the narrow beams completely fall within a coverage area of the broad beam, and the broad beam and the narrow beams have a same physical cell identifier PCI.

With reference to the first aspect, in a first possible implementation manner, the method further includes: determining, by the base station, that the broad beam is used to transmit data to one or more other terminals different from the at least two terminals; and transmitting, by the base station, data to the one or more other terminals by using the broad beam.

With reference to the first possible implementation manner of the first aspect, in a second possible implementation manner, the transmitting, by the base station, data to the at least two terminals on a same time-frequency resource by using the determined narrow beams includes: transmitting, by the base station, data to the at least two terminals on a first time-frequency resource by using the determined narrow beams.

With reference to the second possible implementation manner of the first aspect, in a third possible implementation manner, the transmitting, by the base station, data to the one or more other terminals by using the broad beam includes: transmitting, by the base station, data to the one or more other terminals on a second time-frequency resource different from the first time-frequency resource by using the broad beam.

With reference to any one implementation manner of the first possible implementation manner to the third possible implementation manner of the first aspect, in a fourth possible implementation manner, the determining, by the base station, that the broad beam is used to transmit data to the one or more other terminals includes: separately receiving, by the base station by using an antenna used to transmit the broad beam and antennas used to transmit the narrow beams, a first sounding reference signal SRS sent by each terminal of the one or more other terminals; determining, according to a signal strength value of the first SRS that is sent by each terminal of the one or more other terminals and that is separately received by using the antenna used to transmit the broad beam and the antennas used to transmit the narrow beams, channel quality of a channel that is from the antenna used to transmit the broad beam and to each terminal of the one or more other terminals and channel quality of channels that are from the antennas used to transmit the narrow beams and to each terminal of the one or more other terminals; and when it is obtained, by means of comparison, that the channel quality of the channel that is from the antenna used to transmit the broad beam and to each terminal of the one or more other terminals is better than the channel quality of the channels that are from the antennas used to transmit the narrow beams and to each terminal of the one or more other terminals, determining that the broad beam is used to transmit data to each terminal of the one or more other terminals.

With reference to the fourth possible implementation manner of the first aspect, in a fifth possible implementation manner, the determining, by the base station according to a signal strength value of the first SRS that is sent by each terminal of the one or more other terminals and that is separately received by using the antenna used to transmit the broad beam and the antennas used to transmit the narrow beams, channel quality of a channel that is from the antenna used to transmit the broad beam and to each terminal of the one or more other terminals and channel quality of channels that are from the antennas used to transmit the narrow beams and to each terminal of the one or more other terminals includes: correcting, by the base station according to a correction value that is for the signal strength value and that is separately preset for the antenna used to transmit the broad beam and the antennas used to transmit the narrow beams, the signal strength value of the first SRS that is sent by each terminal of the one or more other terminals and that is separately received by using the antenna used to transmit the broad beam and the antennas used to transmit the narrow beams, so as to obtain each corrected signal strength value of the first SRS; and determining, according to each corrected signal strength value of the first SRS, the channel quality of the channel that is from the antenna used to transmit the broad beam and to each terminal of the one or more other terminals and the channel quality of the channels that are from the antennas used to transmit the narrow beams and to each terminal of the one or more other terminals.

With reference to any one implementation manner of the first possible implementation manner to the fifth possible implementation manner of the first aspect, in a sixth possible implementation manner, the determining, by a base station, that at least two narrow beams are used to transmit data to at least two terminals includes: separately receiving, by the base station by using the antenna used to transmit the broad beam and the antennas used to transmit the narrow beams, a second SRS sent by each terminal of the at least two terminals; determining, according to a signal strength value of the second SRS that is sent by each terminal of the at least two terminals and that is separately received by using the antenna used to transmit the broad beam and the antennas used to transmit the narrow beams, channel quality of a channel that is from the antenna used to transmit the broad beam and to each terminal of the at least two terminals and channel quality of channels that are from the antennas used to transmit the narrow beams and to each terminal of the at least two terminals; and determining that the narrow beams are used to transmit data to each terminal of the at least two terminals, when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals.

With reference to the sixth possible implementation manner of the first aspect, in a seventh possible implementation manner, the determining, by the base station according to a signal strength value of the second SRS that is sent by each terminal of the at least two terminals and that is separately received by using the antenna used to transmit the broad beam and the antennas used to transmit the narrow beams, channel quality of a channel that is from the antenna used to transmit the broad beam and to each terminal of the at least two terminals and channel quality of channels that are from the antennas used to transmit the narrow beams and to each terminal of the at least two terminals includes: correcting, by the base station according to a correction value that is for the signal strength value and that is separately preset for the antenna used to transmit the broad beam and the antennas used to transmit the narrow beams, the signal strength value of the second SRS that is sent by each terminal of the at least two terminals and that is separately received by using the antenna used to transmit the broad beam and the antennas used to transmit the narrow beams, so as to obtain each corrected signal strength value of the second SRS; and determining, according to each corrected signal strength value of the second SRS, the channel quality of the channel that is from the antenna used to transmit the broad beam and to each terminal of the at least two terminals and the channel quality of the channels that are from the antennas used to transmit the narrow beams and to each terminal of the at least two terminals.

With reference to the seventh possible implementation manner of the first aspect, in an eighth possible implementation manner, the determining that the narrow beams are used to transmit data to each terminal of the at least two terminals, when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals includes: selecting, by the base station, a channel with best channel quality from the channels that are from the antennas used to transmit the narrow beams and to each terminal of the at least two terminals; and determining that a narrow beam for selected-channel transmission is used to transmit data to each terminal of the at least two terminals.

With reference to the third possible implementation manner of the first aspect, in a ninth possible implementation manner, the method further includes:

sending, by the base station, a cell-specific reference signal CRS by using the broad beam; and separately sending, by the base station, a channel state information-reference signal CSI-RS by using each narrow beam transmitted by the base station and according to the channel state information-reference signal CSI-RS separately preset for each narrow beam transmitted by the base station, where CSI-RSs set for different narrow beams are different from each other.

With reference to the ninth possible implementation manner of the first aspect, in a tenth possible implementation manner, the transmitting, by the base station, data to the at least two terminals on a first time-frequency resource by using the determined narrow beams includes: separately performing the following operations by the base station on each terminal of the at least two terminals: notifying the terminal of a resource configuration index of a CSI-RS set for a narrow beam used to transmit data to the terminal, and obtaining a corresponding channel state report fed back by the terminal by measuring the CSI-RS; determining the first time-frequency resource according to a channel state report separately fed back to the base station by the at least two terminals; and transmitting data to the at least two terminals on the first time-frequency resource by using the determined narrow beams.

With reference to the ninth possible implementation manner of the first aspect, in an eleventh possible implementation manner, the transmitting, by the base station, data to the one or more other terminals on the second time-frequency resource by using the broad beam includes: obtaining, by the base station, channel state reports fed back to the base station by the one or more other terminals by measuring the CRS received by the one or more other terminals; determining the second time-frequency resource according to the channel state reports; and transmitting data to the one or more other terminals on the second time-frequency resource by using the determined broad beam.

According to a second aspect, a communications apparatus is provided, where the communications apparatus transmits a broad beam and at least two narrow beams, and the apparatus includes: a narrow beam determining module, configured to determine that at least two narrow beams are used to transmit data to at least two terminals; a data transmitting module, configured to transmit data to the at least two terminals on a same time-frequency resource by using the narrow beams determined by the narrow beam determining module; where the broad beam covers a sector of the communications apparatus, coverage areas of the narrow beams completely fall within a coverage area of the broad beam, and the broad beam and the narrow beams have a same physical cell identifier PCI.

With reference to the second aspect, in a first possible implementation manner, the apparatus further includes: a broad beam determining module, configured to determine that the broad beam is used to transmit data to one or more other terminals different from the at least two terminals; and the data transmitting module is further configured to transmit data to the one or more other terminals by using the broad beam.

With reference to the first possible implementation manner of the second aspect, in a second possible implementation manner, the data transmitting module is specifically configured to transmit data to the at least two terminals on a first time-frequency resource by using the determined narrow beams.

With reference to the second possible implementation manner of the second aspect, in a third possible implementation manner, the data transmitting module is specifically configured to transmit data to the one or more other terminals on a second time-frequency resource different from the first time-frequency resource by using the broad beam.

With reference to any one implementation manner of the first to the third possible implementation manners of the second aspect, in a fourth possible implementation manner, the broad beam determining module specifically includes: a signal receiving submodule, configured to separately receive, by using an antenna used to transmit the broad beam and antennas used to transmit the narrow beams, a first sounding reference signal SRS sent by each terminal of the one or more other terminals; a channel quality determining submodule, configured to determine, according to a signal strength value of the first SRS that is sent by each terminal of the one or more other terminals and that is separately received by using the antenna used to transmit the broad beam and the antennas used to transmit the narrow beams, channel quality of a channel that is from the antenna used to transmit the broad beam and to each terminal of the one or more other terminals and channel quality of channels that are from the antennas used to transmit the narrow beams and to each terminal of the one or more other terminals; and a broad beam determining submodule, configured to: when it is obtained, by means of comparison, that the channel quality of the channel that is from the antenna used to transmit the broad beam and to each terminal of the one or more other terminals is better than the channel quality of the channels that are from the antennas used to transmit the narrow beams and to each terminal of the one or more other terminals, determine that the broad beam is used to transmit data to each terminal of the one or more other terminals.

With reference to the fourth possible implementation manner of the second aspect, in a fifth possible implementation manner, the channel quality determining submodule is specifically configured to: correct, according to a correction value that is for the signal strength value and that is separately preset for the antenna used to transmit the broad beam and the antennas used to transmit the narrow beams, the signal strength value of the first SRS that is sent by each terminal of the one or more other terminals and that is separately received by using the antenna used to transmit the broad beam and the antennas used to transmit the narrow beams, so as to obtain each corrected signal strength value of the first SRS; and determine, according to each corrected signal strength value of the first SRS, the channel quality of the channel that is from the antenna used to transmit the broad beam and to each terminal of the one or more other terminals and the channel quality of the channels that are from the antennas used to transmit the narrow beams and to each terminal of the one or more other terminals.

With reference to any one implementation manner of the first to the fifth possible implementation manners of the second aspect, in a sixth possible implementation manner, the narrow beam determining module specifically includes: a signal receiving submodule, configured to separately receive, by using the antenna used to transmit the broad beam and the antennas used to transmit the narrow beams, a second SRS sent by each terminal of the at least two terminals; a channel quality determining submodule, configured to determine, according to a signal strength value of the second SRS that is sent by each terminal of the at least two terminals and that is separately received by using the antenna used to transmit the broad beam and the antennas used to transmit the narrow beams, channel quality of a channel that is from the antenna used to transmit the broad beam and to each terminal of the at least two terminals and channel quality of channels that are from the antennas used to transmit the narrow beams and to each terminal of the at least two terminals; and a narrow beam determining submodule, configured to determine that the narrow beams are used to transmit data to each terminal of the at least two terminals, when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals.

With reference to the sixth possible implementation manner of the second aspect, in a seventh possible implementation manner, the channel quality determining submodule is specifically configured to: correct, according to a correction value that is for the signal strength value and that is separately preset for the antenna used to transmit the broad beam and the antennas used to transmit the narrow beams, the signal strength value of the second SRS that is sent by each terminal of the at least two terminals and that is separately received by using the antenna used to transmit the broad beam and the antennas used to transmit the narrow beams, so as to obtain each corrected signal strength value of the second SRS; and determine, according to each corrected signal strength value of the second SRS, the channel quality of the channel that is from the antenna used to transmit the broad beam and to each terminal of the at least two terminals and the channel quality of the channels that are from the antennas used to transmit the narrow beams and to each terminal of the at least two terminals.

With reference to the seventh possible implementation manner of the second aspect, in an eighth possible implementation manner, the narrow beam determining submodule is specifically configured to: when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals, select a channel with best channel quality from the channels that are from the antennas used to transmit the narrow beams and to each terminal of the at least two terminals; and determine that a narrow beam for selected-channel transmission is used to transmit data to each terminal of the at least two terminals.

With reference to the third possible implementation manner of the second aspect, in a ninth possible implementation manner, the apparatus further includes:

a reference signal sending module, configured to: send a cell-specific reference signal CRS by using the broad beam; and separately send a channel state information-reference signal CSI-RS by using each narrow beam and according to the channel state information-reference signal CSI-RS separately preset for each transmitted narrow beam, where CSI-RSs set for different narrow beams are different from each other.

With reference to the ninth possible implementation manner of the second aspect, in a tenth possible implementation manner, the data transmitting module is specifically configured to: separately perform the following operations on each terminal of the at least two terminals: notifying the terminal of a resource configuration index of a CSI-RS set for a narrow beam used to transmit data to the terminal, and obtaining a corresponding channel state report fed back by the terminal by measuring the CSI-RS; determine the first time-frequency resource according to a channel state report separately fed back to the apparatus by the at least two terminals; and transmit data to the at least two terminals on the first time-frequency resource by using the determined narrow beams.

With reference to the ninth possible implementation manner of the second aspect, in an eleventh possible implementation manner, the data transmitting module is specifically configured to: obtain channel state reports fed back to the apparatus by the one or more other terminals by measuring the CRS received by the one or more other terminals; determine the second time-frequency resource according to the channel state reports; and transmit data to the one or more other terminals on the second time-frequency resource by using the determined broad beam.

A technical effect of the foregoing technical solutions provided in the embodiments of the present invention is as follows:

According to the foregoing solutions provided in the embodiments of the present invention, a base station transmits, at the same time, a broad beam that covers a sector of the base station and narrow beams whose coverage areas completely fall within a coverage area of the broad beam, which implements that under a premise that a coverage area of the sector of the base station maintains unchanged by using the broad beam, enhanced coverage of the sector is further achieved by using the narrow beams, thereby improving spectral efficiency. In the solutions, a sector coverage area of the broad beam transmitted by the base station still maintains unchanged, and therefore, a coverage relationship between sectors is not affected. In addition, neither an additional site backhaul resource nor additional standardization support is required in the solutions.

DETAILED DESCRIPTION OF ILLUSTRATIVE EMBODIMENTS

The following describes the embodiments of the present invention with reference to the accompanying drawings of the specification. It should be understood that the embodiments described herein are merely used to describe and explain the present invention, but are not intended to limit the present invention. In addition, in a case of no conflict, the embodiments in the specification and the features in the embodiments may be mutually combined.

Figure 1:
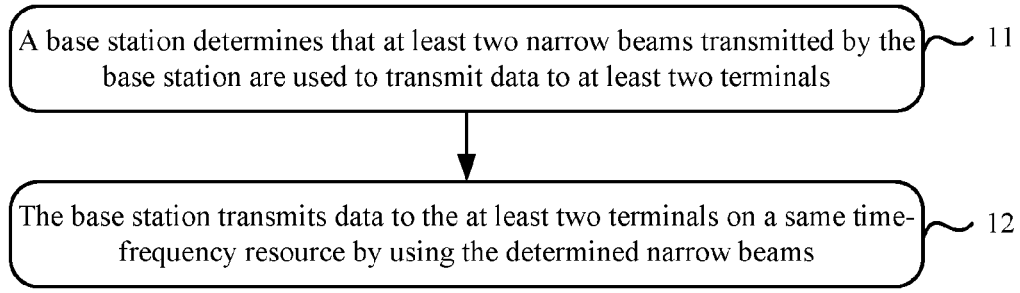
FIG. 1 is a schematic flowchart of specific implementation of a communication method according to an embodiment of the present invention.

An embodiment of the present invention provides a communication method shown in FIG. 1, where the method mainly includes the following steps:

Step 11: A base station determines that at least two narrow beams transmitted by the base station are used to transmit data to at least two terminals.

The base station may transmit a broad beam and at least two narrow beams, and the foregoing "at least two terminals" are terminals that fall within coverage areas of the narrow beams that are determined by the base station and to be used to transmit data to these terminals. Specifically, it is assumed that narrow beams currently transmitted by the base station are a narrow beam 1, a narrow beam 2, and a narrow beam 3 respectively, and a terminal 1 falls within a coverage area of the narrow beam 1, a terminal 2 falls within a coverage area of the narrow beam 2, and a terminal 3 not only falls within the coverage area of the narrow beam 2 but also falls within a coverage area of the narrow beam 3, then, according to a determining rule, the base station may determine the narrow beam 1 as a beam used to transmit data to the terminal 1, determine the narrow beam 2 as a beam used to transmit data to the terminal 2, and determine both the narrow beam 2 and the narrow beam 3 as beams used to transmit data to the terminal 3. The determining rule described herein may be related to a signal strength value of a sounding reference signal SRS that is separately sent by the terminal 1, the terminal 2, and the terminal 3 and that is received by the base station. A specific determining rule is described in the following and is not described herein again.

In this embodiment of the present invention, the broad beam and the narrow beams that are transmitted by the base station may meet: the broad beam covers a sector of the base station; coverage areas of the narrow beams are smaller than a coverage area of the broad beam; the coverage areas of the narrow beams completely fall within the coverage area of the broad beam; and the broad beam and the narrow beams have a same physical cell identifier (PCI). Because the broad beam and the narrow beams have the same PCI, the following problem may be avoided: different PCIs are respectively used for the broad beam and the narrow beams, which cause excessively strong interference between the broad beam and the narrow beams, and as a result, a terminal cannot normally receive the broad beam or the narrow beams.

Figure 2:
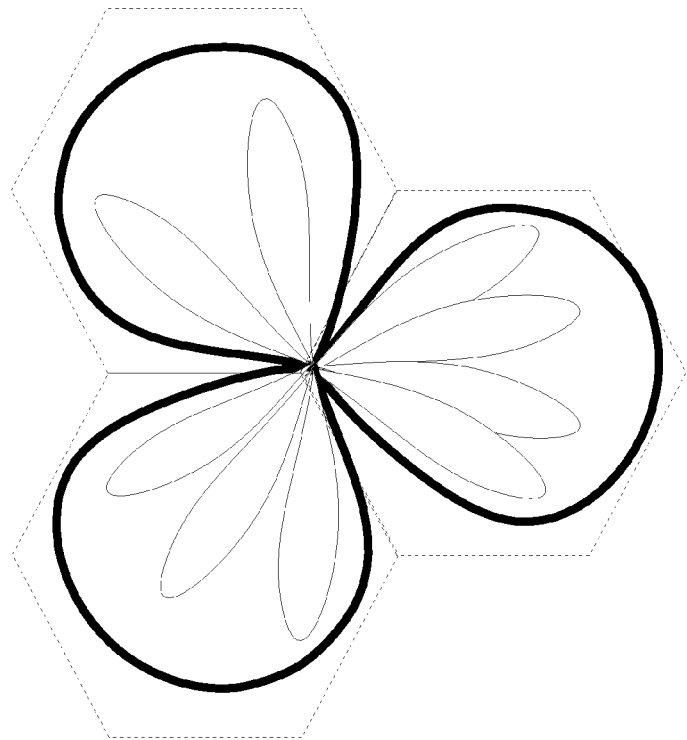
FIG. 2 is a schematic diagram of broad beams and narrow beams that are deployed in different sectors according to a solution provided in an embodiment of the present invention.

In this embodiment of the present invention, a macro base station is used as an example. In a case in which an existing antenna deployment of the macro base station maintains unchanged, improvement of a capacity of a coverage area of the macro base station is implemented by forming several additional narrow beams with relatively narrow horizontal beam width to point to a particular area within the coverage area of the macro base station. As shown in FIG. 2, ranges outlined by thick solid lines represent coverage areas of three broad beams transmitted by the macro base station; ranges outlined by thin solid lines represent coverage areas of multiple narrow beams transmitted by the macro base station when transmitting the three broad beams; and ranges outlined by dashed lines represent sectors of the macro base station. A single enclosed area outlined by a thin solid line represents a coverage area of a single narrow beam.

It is worth noting that quantities of narrow beams deployed in different sectors shown in FIG. 2 may be different. Generally, a quantity of narrow beams deployed in any sector is related to a terminal distribution status within the sector, a capacity requirement of the sector, and the like. In addition, antenna configurations of different narrow beams may also be different from each other. Specifically, the antenna configurations described herein may include configurations of indicators such as a horizontal direction of an antenna, transmitted beam width, a downtilt angle of the transmitted beam, transmit power of a transmitted beam, and/or a quantity of ports (Port).

An antenna configuration of each narrow beam may be a static configuration, or may be a semi-static configuration. The static configuration indicates that the foregoing indicators, for example, are configured for an antenna based on network planning, and once configuration of these indicators is completed, these indicators are generally not adjusted subsequently; whereas the semi-static configuration indicates that the foregoing indicators, for example, may be first configured for the antenna based on the network planning, and subsequently, after a base station obtains, by means of statistics collecting, some information (such as information about a quantity of terminals served by the antenna) that is produced within a period of time (the period of time described herein may be one hour, may be one day, or the like) and related to a beam transmitted by using the antenna, the indicators configured for the antenna are further configured according to the information.

Step 12: The base station transmits data to the foregoing at least two terminals on a same time-frequency resource by using the determined narrow beams.

According to the method provided in this embodiment of the present invention, a base station transmits, at the same time, a broad beam that covers a sector of the base station and narrow beams whose coverage areas completely fall within a coverage area of the broad beam, which can implement that under a premise that a coverage area of the sector of the base station maintains unchanged by using the broad beam, data is further transmitted to a terminal by using the narrow beams, thereby achieving a purpose of enhancing coverage of the sector and improving a system capacity.

In this embodiment of the present invention, a mode of transmitting, by the base station, data to the at least two terminals on the same time-frequency resource by using the determined narrow beams may include but is not limited to the following several modes and a combination thereof:

1. The base station transmits data to the at least two terminals on the same time-frequency resource by using the determined narrow beams and in a manner of separately transmitting data to different terminals by using different narrow beams.

2. The base station transmits data to the at least two terminals on the same time-frequency resource by using the determined narrow beams and in a manner of transmitting data to a same terminal by using at least two narrow beams.

Specifically, it is assumed that: narrow beams transmitted by the base station are a narrow beam A, a narrow beam B, a narrow beam C, and a narrow beam D respectively, a terminal a, a terminal b, a terminal c, and a terminal d exist in a coverage area of a broad beam of a sector, and a coverage area within which each terminal falls is as follows:

the terminal a falls within a coverage area of the narrow beam A;

the terminal b falls within a common coverage area of the narrow beam A and the narrow beam B;

the terminal c falls within a coverage area of the narrow beam C; and the terminal d falls within a common coverage area of the narrow beam C and the narrow beam D.

Then, based on such an assumption, according to the foregoing first mode, on the same time-frequency resource, the base station may transmit data to the terminal a by using the narrow beam A, and transmit data to the terminal c by using the narrow beam C, and according to the foregoing second mode, on the same time-frequency resource, the base station may transmit data to the terminal b by using both the narrow beam A and the narrow beam B, and transmit data to the terminal d by using both the narrow beam C and the narrow beam D.

Optionally, the foregoing method provided in this embodiment of the present invention may further include the following step:

The base station determines that the broad beam is used to transmit data to one or more other terminals different from the foregoing at least two terminals, and transmits data to the foregoing one or more other terminals by using the broad beam.

In this embodiment of the present invention, an execution sequence of the step and the foregoing step 11 and step 12 is not specified, that is, the step may be executed after step 12, may be executed in parallel with step 11, or the like.

The foregoing method provided in this embodiment of the present invention further includes the foregoing step, which can implement that the base station separately transmits data to different terminals by using the broad beam and the narrow beams that are transmitted by the base station, so that a system capacity can be improved.

Optionally, when the base station separately transmits data to the different terminals by using the broad beam and the narrow beams that are transmitted by the base station, a specific implementation manner of the foregoing step 12 may include: transmitting, by the base station, data to the foregoing at least two terminals on a first time-frequency resource by using the determined narrow beams. Similarly, a specific implementation manner of transmitting, by the base station, data to the one or more other terminals by using the broad beam may include: transmitting, by the base station, data to the one or more other terminals on a second time-frequency resource different from the first time-frequency resource by using the broad beam. According to this implementation manner, staggered time-frequency resources may be used when the broad beam and the narrow beams are used to separately transmit data to the different terminals, thereby avoiding mutual interference when the broad beam and the narrow beams are used to separately transmit data to the different terminals.

In this embodiment of the present invention, whether the base station determines that the broad beam is used to transmit data to a terminal, or determines that the narrow beams are used to transmit data to a terminal, a determining basis may be a sounding reference signal (SRS) sent by the terminal. Alternatively, if a level of quality of a service provided by a beam for the terminal is not considered, the base station may not use the SRS sent by the terminal as a basis, but instead selects, once it is detected that a terminal moves into a coverage area of a beam, the beam as a beam that serves the terminal, that is, selects the beam to transmit data to the terminal.

Specifically, a process of determining, by the base station, that the broad beam is used to transmit data to the one or more other terminals may include:

separately receiving, by the base station by using an antenna used to transmit the broad beam and antennas used to transmit the narrow beams, a first SRS sent by each terminal of the one or more other terminals; determining, according to a signal strength value of the first SRS that is sent by each terminal of the one or more other terminals and that is separately received by using the antenna used to transmit the broad beam and the antennas used to transmit the narrow beams, channel quality of a channel that is from the antenna used to transmit the broad beam and to each terminal of the one or more other terminals and channel quality of channels that are from the antennas used to transmit the narrow beams and to each terminal of the one or more other terminals; and when it is obtained, by means of comparison, that the channel quality of the channel that is from the antenna used to transmit the broad beam and to each terminal of the one or more other terminals is better than the channel quality of the channels that are from the antennas used to transmit the narrow beams and to each terminal of the one or more other terminals, determining that the broad beam is used to transmit data to each terminal of the one or more other terminals.

For example, it is assumed that narrow beams transmitted by the base station are a broad beam A, a narrow beam B, and a narrow beam C respectively, and it is assumed that the foregoing "one or more other terminals" include a terminal a and a terminal b that fall within a coverage area of a broad beam of a sector of the base station. In addition, it is assumed that a signal strength value of a first SRS that is sent by the terminal a and received by using an antenna used to transmit the broad beam A is −70 dBm; a signal strength value of a first SRS that is transmitted by the terminal b and received by using the antenna used to transmit the broad beam A is −74 dBm; a signal strength value of a first SRS that is sent by the terminal a and received by using an antenna used to transmit the narrow beam B is −76 dBm; a signal strength value of a first SRS that is sent by the terminal b and received by using the antenna used to transmit the narrow beam B is −78 dBm; a signal strength value of a first SRS that is sent by the terminal a and received by using an antenna used to transmit the narrow beam C is −78 dBm; a signal strength value of a first SRS that is sent by the terminal b and received by using the antenna used to transmit the narrow beam C is −79 dBm. A signal strength value of a first SRS that is from a terminal and received by using an antenna may directly indicate a level of channel quality of a channel from the antenna to the terminal, and a larger signal strength value indicates better channel quality of a corresponding channel.

It can be learned, based on the foregoing description, that for the terminal a, the signal strength value −70 dBm of the first SRS that is sent by the terminal a and received by using the antenna used to transmit the broad beam A is not only greater than the signal strength value −76 dBm of the first SRS that is sent by the terminal a and received by using the antenna used to transmit the narrow beam B, but also greater than the signal strength value −78 dBm of the first SRS that is sent by the terminal a and received by using the antenna used to transmit the narrow beam C, so that channel quality of a channel that is from the antenna used to transmit the broad beam A and to the terminal a is higher, and therefore, the broad beam A may be determined as a beam used to transmit data to the terminal a.

Similarly, for the terminal b, the signal strength value −74 dBm of the first SRS that is sent by the terminal b and received by using the antenna used to transmit the broad beam A is not only greater than the signal strength value −78 dBm of the first SRS that is sent by the terminal b and received by using the antenna used to transmit the narrow beam B, but also greater than the signal strength value −79 dBm of the first SRS that is sent by the terminal b and received by using the antenna used to transmit the narrow beam C, so that channel quality of a channel that is from the antenna used to transmit the broad beam A and to the terminal b is higher, and therefore, the broad beam A may be determined as a beam used to transmit data to the terminal b.

Optionally, a process of determining, by the base station according to a signal strength value of the first SRS that is sent by each terminal of the one or more other terminals and that is separately received by using the antenna used to transmit the broad beam and the antennas used to transmit the narrow beams, channel quality of a channel that is from the antenna used to transmit the broad beam and to each terminal of the one or more other terminals and channel quality of channels that are from the antennas used to transmit the narrow beams and to each terminal of the one or more other terminals may specifically include the following steps:

correcting, by the base station according to a correction value that is for the signal strength value and that is separately preset for the antenna used to transmit the broad beam and the antennas used to transmit the narrow beams, the signal strength value of the first SRS that is sent by each terminal of the one or more other terminals and that is separately received by using the antenna used to transmit the broad beam and the antennas used to transmit the narrow beams, so as to obtain each corrected signal strength value of the first SRS; and determining, by the base station according to each corrected signal strength value of the first SRS, the channel quality of the channel that is from the antenna used to transmit the broad beam and to each terminal of the one or more other terminals and the channel quality of the channels that are from the antennas used to transmit the narrow beams and to each terminal of the one or more other terminals.

A specific example of correcting, according to the correction value for the signal strength value, the signal strength value of the first SRS received by using an antenna is: it is assumed that beams transmitted by the base station include one broad beam and two narrow beams, and signal strength values of the first SRSs separately received by using an antenna used to transmit the broad beam and antennas used to transmit the narrow beams are −70 dBm, −72 dBm, and −77 dBm respectively, and correction values that are for the signal strength values and that are separately set for the antenna used to transmit the broad beam and the antennas used to transmit the narrow beams are 3 dB, 6 dB, and 6 dB respectively. Corrected signal strength values that are of the first SRSs and are obtained after these several signal strength values −70 dBm, −72 dBm, and −77 dBm are corrected are −67 dBm, −66 dBm, and −71 dBm respectively. The correction values for the signal strength values separately set for the antenna used to transmit the broad beam and the antennas used to transmit the narrow beams may be related to factors such as antenna gains of the antenna used to transmit the broad beam and the antennas used to transmit the narrow beams, a quantity of antennas used to transmit the narrow beams, quantities of terminals served by different beams, and transmit power of the different beams.

Similarly, a process of determining, by a base station, that at least two narrow beams transmitted by the base station are used to transmit data to at least two terminals may include:

separately receiving, by the base station by using the antenna used to transmit the broad beam and the antennas used to transmit the narrow beams, a second SRS sent by each terminal of the at least two terminals;

determining, according to a signal strength value of the second SRS that is sent by each terminal of the at least two terminals and that is separately received by using the antenna used to transmit the broad beam and the antennas used to transmit the narrow beams, channel quality of a channel that is from the antenna used to transmit the broad beam and to each terminal of the at least two terminals and channel quality of channels that are from the antennas used to transmit the narrow beams and to each terminal of the at least two terminals; and determining that the narrow beams are used to transmit data to each terminal of the at least two terminals, when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals.

For example, it is still assumed that narrow beams transmitted by the base station are a narrow beam A, a narrow beam B, and a narrow beam C respectively, and it is assumed that the foregoing "at least two terminals" include a terminal c and a terminal d that fall within a coverage area of a broad beam of a sector of the base station. In addition, it is assumed that a signal strength value of a second SRS that is sent by the terminal c and received by using an antenna used to transmit the broad beam A is −79 dBm; a signal strength value of a second SRS that is transmitted by the terminal d and received by using the antenna used to transmit the broad beam A is −78 dBm; a signal strength value of a second SRS that is sent by the terminal c and received by using an antenna used to transmit the narrow beam B is −76 dBm; a signal strength value of a second SRS that is sent by the terminal d and received by using the antenna used to transmit the narrow beam B is −76 dBm; a signal strength value of a second SRS that is sent by the terminal c and received by using an antenna used to transmit the narrow beam C is −75 dBm; a signal strength value of a second SRS that is sent by the terminal d and received by using the antenna used to transmit the narrow beam C is −73 dBm. A signal strength value of a second SRS that is from a terminal and received by using an antenna may directly indicate a level of channel quality of a channel from the antenna to the terminal, and a larger signal strength value indicates better channel quality of a corresponding channel.

It can be learned, based on the foregoing description, that for the terminal c, the signal strength value −79 dBm of the second SRS that is sent by the terminal c and received by using the antenna used to transmit the broad beam A is not only less than the signal strength value −76 dBm of the second SRS that is sent by the terminal c and received by using the antenna used to transmit the narrow beam B, but also less than the signal strength value −75 dBm of the second SRS that is sent by the terminal c and received by using the antenna used to transmit the narrow beam C, so that it can be determined that channel quality of a channel that is from an antenna used to transmit a narrow beam and to the terminal c is higher, and particularly, channel quality of a channel that is from the antenna used to transmit the narrow beam C and to the terminal c is higher, and therefore, the narrow beam C may be determined as a beam used to transmit data to the terminal c.

Similarly, for the terminal d, the signal strength value −78 dBm of the second SRS that is sent by the terminal d and received by using the antenna used to transmit the broad beam A is not only less than the signal strength value −76 dBm of the second SRS that is sent by the terminal d and received by using the antenna used to transmit the narrow beam B, but also less than the signal strength value −75 dBm of the second SRS that is sent by the terminal d and received by using the antenna used to transmit the narrow beam C, so that it can be determined that channel quality of a channel that is from an antenna used to transmit a narrow beam and to the terminal d is higher, and particularly, channel quality of a channel that is from the antenna used to transmit the narrow beam C and to the terminal d is higher, and therefore, the narrow beam C may be determined as a beam used to transmit data to the terminal d.

Optionally, a process of determining, by the base station according to a signal strength value of the second SRS that is sent by each terminal of the at least two terminals and that is separately received by using the antenna used to transmit the broad beam and the antennas used to transmit the narrow beams, channel quality of a channel that is from the antenna used to transmit the broad beam and to each terminal of the at least two terminals and channel quality of channels that are from the antennas used to transmit the narrow beams and to each terminal of the at least two terminals may specifically include:

first, correcting, by the base station according to a correction value that is for the signal strength value and that is separately preset for the antenna used to transmit the broad beam and the antennas used to transmit the narrow beams, the signal strength value of the second SRS that is sent by each terminal of the at least two terminals and that is separately received by using the antenna used to transmit the broad beam and the antennas used to transmit the narrow beams, so as to obtain each corrected signal strength value of the second SRS, where a manner of correcting the signal strength value of the second SRS according to the correction value of the signal strength value is similar to that in the foregoing description, and is not described herein again; and then, determining, by the base station according to each corrected signal strength value of the second SRS, the channel quality of the channel that is from the antenna used to transmit the broad beam and to each terminal of the at least two terminals and the channel quality of the channels that are from the antennas used to transmit the narrow beams and to each terminal of the at least two terminals.

Optionally, a specific implementation process of determining, by the base station, that the narrow beams are used to transmit data to each terminal of the at least two terminals, when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals may include: selecting, by the base station, a channel with best channel quality from the channels that are from the antennas used to transmit the narrow beams and to each terminal of the at least two terminals; and determining that a narrow beam for selected-channel transmission is used to transmit data to each terminal of the at least two terminals.

In this embodiment of the present invention, the base station may further first determine, according to each corrected signal strength value of the second SRS, whether there exist, in antennas used to separately transmit different narrow beams, at least two antennas for which channel quality of channels from the at least two antennas to the terminal is better than the channel quality of the channel that is from the antenna used to transmit the broad beam and to the terminal. If a determining result is that at least two antennas as such exist, a largest corrected signal strength value of the second SRS and a second largest corrected signal strength value of the second SRS may be determined from corrected signal strength values of the second SRSs. Further, if it is determined that a difference between the largest corrected signal strength value of the second SRS and the second largest corrected signal strength value of the second SRS is less than a preset threshold, a narrow beam for transmission of a channel corresponding to the largest corrected signal strength value of the second SRS and a narrow beam for transmission a channel corresponding to the second largest corrected signal strength value of the second SRS may be selected to transmit data to the terminal. According to this manner, two narrow beams for transmission of channels between which a channel quality difference is relatively small may be selected to jointly transmit data to the terminal, so as to obtain a gain of space division multiplexing.

The following further describes, after the base station completes determining of the beam used to transmit data to the terminal, how to transmit data to the at least two terminals on the first time-frequency resource by using the determined narrow beams and how to transmit data to the one or more other terminals different from the at least two terminals on the second time-frequency resource by using the broad beam.

The base station may send a cell-specific reference signal (CRS) by using the broad beam; and according to a channel state information-reference signal (CSI-RS) separately preset for each narrow beam transmitted by the base station, separately sends the channel state information-reference signal CSI-RS by using each narrow beam transmitted by the base station, where CSI-RSs set for different narrow beams are different from each other. Specifically, the CRS sent by the base station by using the broad beam and the CSI-RS sent by the base station by using each narrow beam are further explained in Embodiment 1.

The base station may subsequently select, based on a channel state report fed back by a terminal on a reference signal received by the terminal, a time-frequency resource used to transmit data to the terminal. Specifically, a specific implementation process of transmitting, by the base station, data to the at least two terminals on a first time-frequency resource by using the determined narrow beams may include:

Substep 1: The base station performs the following operations on each terminal of the at least two terminals: notifying the terminal of a resource configuration index of a CSI-RS set for a narrow beam used to transmit data to the terminal, and obtaining a corresponding channel state report fed back by the terminal by measuring the CSI-RS, where CSI-RSs configured for different narrow beams are different from each other, and resource configuration indexes of different CSI-RSs are also different from each other.

For the terminal, the terminal may measure, according to the resource configuration index that is of the CSI-RS set for the narrow beam used to transmit data to the terminal and that is notified by the base station, the CSI-RS that matches the index to obtain the corresponding channel state report, and feed back the channel state report to the base station.

Substep 2: The base station determines the first time-frequency resource according to a channel state report separately fed back to the base station by the at least two terminals.

Generally, the terminal feeds back a channel state of each subband on a full band to the base station. In this way, the base station may select a resource block of a channel with a relatively good channel state, that is, relatively high channel quality, as a resource block subsequently used to transmit data to the terminal. The resource block selected by the base station is the first time-frequency resource described herein. In this embodiment of the present invention, a manner of determining, by the base station according to the channel state report fed back by the terminal, the time-frequency resource subsequently used to transmit data may be a similar manner in the prior art, and therefore details are not described herein again.

Substep 3: The base station transmits data to the at least two terminals on the first time-frequency resource by using the determined narrow beams.

Similarly, a specific implementation process of transmitting, by the base station, data to the one or more other terminals different from the at least two terminals on the second time-frequency resource by using the broad beam may include the following substeps:

Substep 1: The base station obtains channel state reports fed back to the base station by the one or more other terminals by measuring the CRS received by the one or more other terminals.

Substep 2: The base station determines the second time-frequency resource according to the channel state reports.

A manner of determining, by the base station, the second time-frequency resource according to the channel state reports is similar to the above-described manner of determining, by the base station, the first time-frequency resource according to the channel state report, and therefore details are not described herein again.

Substep 3: The base station transmits data to the one or more other terminals on the second time-frequency resource by using the broad beam.

According to the foregoing solutions provided in the embodiments of the present invention, a base station transmits, at the same time, a broad beam whose coverage area is not smaller than a preset coverage area of a sector of the base station, and narrow beams whose coverage areas completely fall within the coverage area of the broad beam, which implements that under a premise that a coverage area of the sector of the base station maintains unchanged by using the broad beam, a purpose of enhancing coverage of the sector and improving a system capacity is further achieved by using the narrow beams. In the solutions, a sector coverage area of the broad beam transmitted by the base station still maintains unchanged, and therefore, a coverage relationship between sectors is not affected. In addition, neither an additional site backhaul resource nor additional standardization support is required in the solutions.

Multiple embodiments are used as examples in the following to describe an actual application of the solutions provided in the embodiments of the present invention in detail.

Embodiment 1

In Embodiment 1, in a case in which a base station further transmits narrow beams when transmitting the foregoing broad beam, an example in which a terminal is user equipment (UE) such as a mobile phone is used. To avoid impact of the narrow beams on an original UE attachment process in the prior art, the base station may be allowed to still send a CRS on a full band in all subframes of the broad beam by using the broad beam. For example, it is assumed that the base station further transmits three narrow beams when transmitting one broad beam, an antenna used to transmit the broad beam has two ports, and an antenna used to transmit a single narrow beam also has two ports, then the broad beam and the narrow beams that are transmitted by the base station may form a coverage area shown in FIG. 3. For meanings of lines in FIG. 3, reference is made to the foregoing description of the meanings of the lines in FIG. 2, and details are not described herein again.

Figure 3:
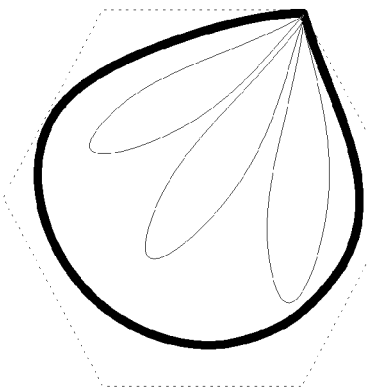
FIG. 3 is a schematic diagram of coverage areas of a broad beam and narrow beams that are transmitted by a base station in Embodiment 1.

Based on an assumption condition shown in FIG. 3, the base station may send a CRS on all resource blocks (RB) on a full band of the broad beam.

Figure 4A:
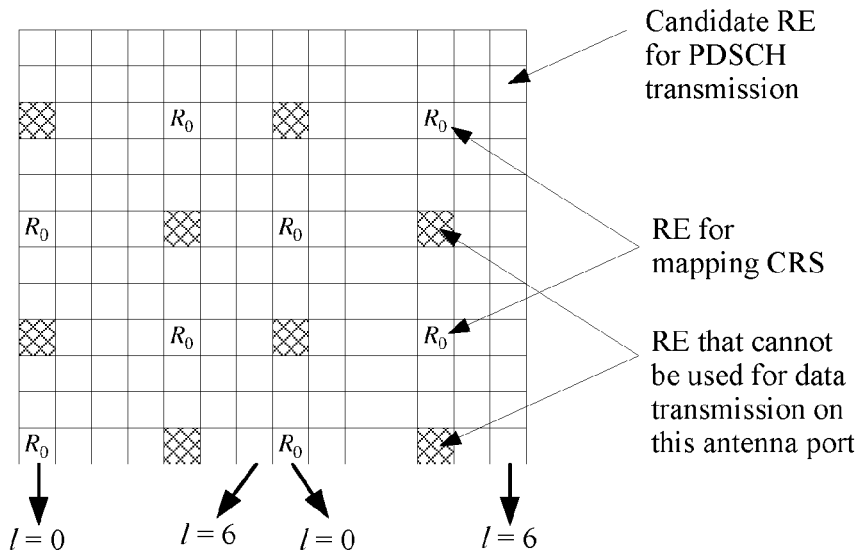
FIG. 4a is a diagram of REs occupied by a CRS that is sent by a base station on an antenna port (Port 0) at a granularity of an RB by using a broad beam in Embodiment 1.
Figure 4B:
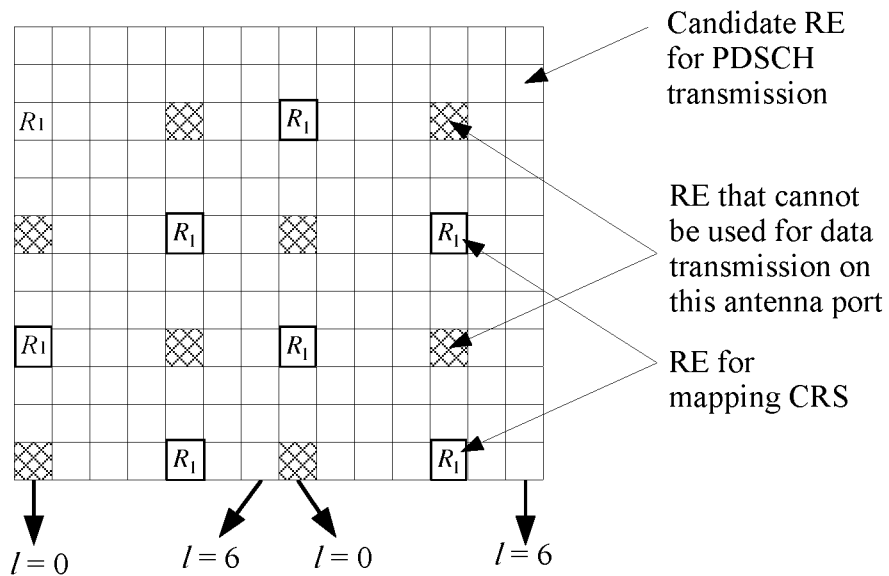
FIG. 4b is a diagram of REs occupied by a CRS that is sent by a base station on an antenna port (Port 1) at a granularity of an RB by using a broad beam in Embodiment 1.
Figure 5A:
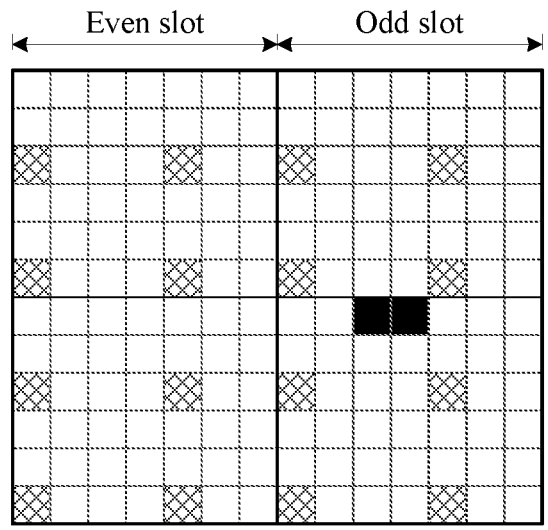
FIG. 5a is a diagram of REs occupied by a first CSI-RS at a granularity of an RB in Embodiment 1.
Figure 5B:
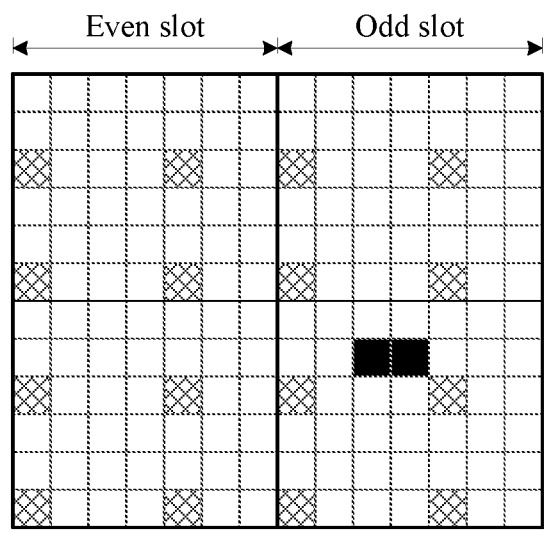
FIG. 5b is a diagram of REs occupied by a second CSI-RS at a granularity of an RB in Embodiment 1.
Figure 5C:
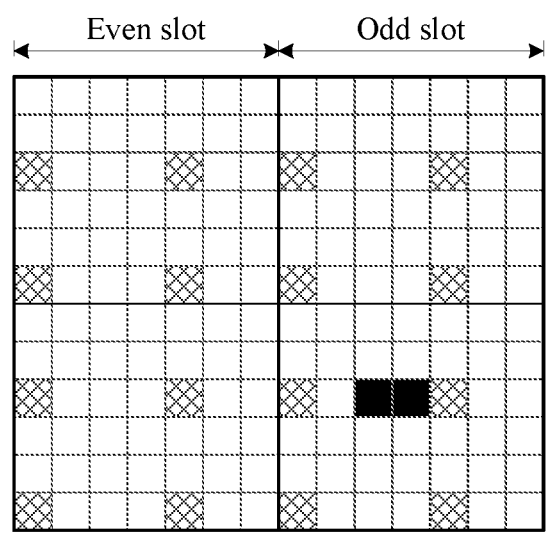
FIG. 5c is a diagram of REs occupied by a third CSI-RS at a granularity of an RB in Embodiment 1.
Figure 5D:
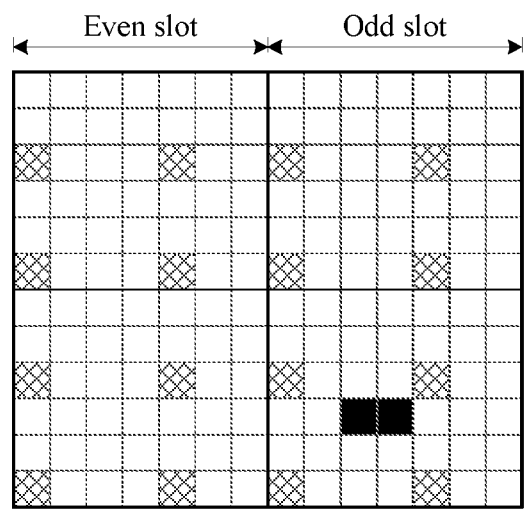
FIG. 5d is a diagram of REs occupied by a fourth CSI-RS at a granularity of an RB in Embodiment 1.

Specifically, FIG. 4a and FIG. 4b show diagrams of REs occupied by a CRS separately sent by the base station on an antenna port Port 0 and an antenna port Port 1 at a granularity of an RB by using the broad beam under the foregoing assumption condition. In the diagrams, R0 and R1 are REs for mapping the CRS on the antenna port Port 0 and the antenna port Port 1 respectively, 1 represents a number of an OFDM symbol included in a single timeslot, an RE filled with grid shadow is an RE that cannot be used for data transmission (Not used for transmission on this antenna port) on this antenna port (that is, the antenna port Port 0 or the antenna port Port 1). In addition, a candidate RE for PDSCH transmission, that is, an RE filled with no color, is further marked in FIG. 4a and FIG. 4b.

In Embodiment 1, the CRS is sent by using only the broad beam; therefore, it can be ensured that in a case in which the base station transmits the broad beam and the narrow beams, the narrow beams transmitted by the base station do not affect a coverage relationship between a sector covered by the broad beam and a neighboring cell. In addition, transmission may also performed on all channels which are demodulated based on CRS, such as a PDCCH and a physical broadcast channel (PBCH), by using the broad beam.

For the narrow beams, before data is transmitted to UE by using a narrow beam, a time-frequency resource may be properly scheduled for the UE based on a condition of a channel that is from an antenna of the narrow beam to be used to transmit data to the UE and to the UE, and therefore, the UE may properly feed back, to the base station, a channel condition of the narrow beam used to transmit data to the UE.

To make the UE that will perform data transmission by using the narrow beam can properly feed back the channel condition of the narrow beam, in Embodiment 1, each narrow beam may be used to send a different CSI-RS. In addition, the narrow beam may be used to send a CRS the same as a CRS sent by using the broad beam, or the narrow beam may be used to send no CRS. It should be noted that, whether the narrow beam is used to send a CRS, to achieve a purpose of avoiding interference between control channels on which transmission are performed by using different beams, and handover that may occur when a user equipment moves between different beams, a same PCI is used for the broad beam and the narrow beams in Embodiment 1.

In Embodiment 1, a CSI-RS instead of a CRS may be sent by using a narrow beam. The CSI-RS is a downlink pilot signal defined in the LTE Rel-9 release, a minimum sending period of the CSI-RS is 5 ms, and locations of REs occupied by the CSI-RS may have 20 configurations. If the base station transmits four narrow beams at the same time, and each narrow beam is transmitted on two antenna ports, the four narrow beams may be used to respectively send four different CSI-RSs. It can be learned, according to a provision for a configuration manner of an RE in the LTE-Advanced R10 release, that diagrams of REs occupied by these four different CSI-RSs at a granularity of an RB are shown in FIG. 5a to FIG. 5d. In the diagrams: two REs filled with black shadow respectively are REs occupied by CSI-RSs separately sent by using two antenna ports used to send the CSI-RSs; and an RE filled with grid shadow is an RE that cannot be used for data transmission on this antenna port (Not used for transmission on this antenna port). In addition, FIG. 5a to FIG. 5d further mark candidate REs used for PDSCH transmission, that is, REs filled with no color, and mark even slots (Even slot) and odd slots (Odd slot). The information does not require improvement of the prior art, and therefore details are not described herein again. In Embodiment 1, for any narrow beam, the base station may notify UE, which will perform data transmission by using the narrow beam, of a pilot configuration of a CSI-RS (such as a resource configuration index of the CSI-RS) of the narrow beam, so as to instruct the corresponding UE to measure, when receiving a CSI-RS that matches the resource configuration index of the CSI-RS configured for the narrow beam used to transmit data to the corresponding UE, the CSI-RS and report a channel state report. Therefore, after receiving the channel state report, the base station may determine quality of a channel that is from an antenna used to transmit the narrow beam and to the UE, and determine, according to the determined quality of the channel, a proper time-frequency resource required when sending downlink data by using the narrow beam.

Similarly, for the broad beam, the base station may send, by using the broad beam, a CRS to UE that will perform data transmission by using the broad beam. Further, after receiving a channel state report fed back by measuring the CRS by the UE that will perform data transmission by using the broad beam, the base station may determine quality of a channel that is from an antenna used to transmit the broad beam and to the UE, and determine, according to the determined quality of the channel, a proper time-frequency resource required when sending downlink data by using the broad beam.

Specifically, for a specific implementation manner of selecting, by the base station, a time-frequency resource occupied by downlink data transmitted by using a different beam, reference is made to the following Embodiment 3.

It should be noted that if multiple narrow beams are used to transmit data to a same UE, corresponding resource configuration indexes of multiple CSI-RSs may be configured for the UE, and in this way, the UE may perform channel state reporting based on the multiple CSI-RSs. Specifically, for an implementation manner about how to determine that the multiple narrow beams are used to transmit data to the same UE, reference is made to the following Embodiment 4.

Embodiment 2

According to the communication method provided in this embodiment of the present invention, a base station transmits a broad beam and at least two narrow beams at the same time, and therefore, before data is transmitted to a particular UE and a configuration index of a CSI-RS is indicated for the particular UE, one or more proper serving beams may be first selected for the particular UE.

Due to reciprocity of a path loss, when a serving beam is selected for the UE, selection may be performed based on an uplink signal, or may be performed based on a downlink signal. In Embodiment 2, it is assumed that the base station selects, for the UE based on signal strength values of SRSs received by using an antenna used to transmit the broad beam and antennas used to transmit the narrow beams, a beam used to transmit data to the UE.

In an LTE system, UE may periodically send an SRS according to a base station configuration, so that the base station determines an uplink channel from the UE to the base station. SRS sent by different UEs may be distinguished by using TDM/FDM/CDM.

In Embodiment 2, each time an SRS sent by any UE is received, antennas that are used to transmit different beams in the base station record signal strength values of SRSs that are sent by the UE and received by using the antennas, so that the base station may separately calculate, based on signal strength values that are of the SRSs sent by the UE and recorded by the antennas for many times, an average value of the signal strength values that are of the SRSs sent by the UE and recorded by each antenna.

Then, optionally, the base station may correct, according to a preset correction value for a signal strength value, each calculated average value of the signal strength values of the SRSs sent by the UE. For example, for an antenna used to transmit the broad beam, an average value of signal strength values of the SRSs corresponding to the antenna may be corrected according to a first correction value preset for the antenna. A specific correcting method may be: subtracting the first correction value from the average value of the signal strength values of the SRSs corresponding to the antenna, which is equivalent to decreasing the average value of the signal strength values of the SRSs corresponding to the antenna.

In Embodiment 2, different correction values may be configured for the antennas used to transmit different beams. Specifically, a quantity of beams transmitted by the base station, transmit power of a beam, a quantity that is of UEs that can be served by different beams and that is predicted for the different beams, and/or the like, may be used as a basis for configuring the foregoing correction value. For example, if a quantity that is of UEs that can be served by a broad beam and that is predicted for the broad beam is greater than a quantity of UEs served by any narrow beam, and a value of transmit power of the broad beam is greater than a value of transmit power of the any narrow beam, a smaller correction value may be configured for an antenna used to transmit the broad beam, and a larger correction value may be configured for an antenna used to transmit the narrow beam, so as to make a probability of selecting the broad beam as a serving beam used to transmit data to the UE larger.

For another example, if a quantity of narrow beams transmitted by the base station is greater than a specified quantity threshold, a larger correction value may be configured for an antenna used to transmit the broad beam, and a smaller correction value may be configured for an antenna used to transmit a narrow beam, so as to make a probability of selecting the narrow beam as a serving beam used to transmit data to the UE larger.

For still another example, if transmit power of a narrow beam transmitted by the base station is greater than transmit power of another narrow beam, a smaller correction value may be configured for an antenna used to transmit the narrow beam, and a larger correction value may be configured for an antenna used to transmit the another narrow beam, so as to make a probability of selecting the narrow beam as a serving beam of the UE larger compared with a probability of selecting the another narrow beam as a serving beam of the UE.

In Embodiment 2, when correction of the average value of the signal strength values of the SRSs that are of the UE and received by using the antennas used to transmit different beams is completed, based on a corrected average value of the signal strength values, it can be implemented that a serving beam used to transmit data to the UE that sends the SRSs is selected for the UE according to a criterion. For example, only a beam transmitted by using an antenna corresponding to a largest corrected average value of the signal strength values may be selected as a beam used to transmit data to the UE. Optionally, beams separately transmitted by using antennas corresponding to the largest corrected average value of the signal strength values and a second largest corrected average value of the signal strength values are narrow beams, and a difference between the largest corrected average value and the second largest corrected average value is less than a specified difference threshold, the narrow beams transmitted by using the antennas respectively corresponding to the largest corrected average value and the second largest corrected average value may be selected as beams used to transmit data to the UE.

Embodiment 3

In an actual application, a coverage area of any narrow beam completely falls within a coverage area of a broad beam, and therefore, if both the broad beam and the narrow beam are used to perform downlink data transmission on a same time-frequency resource, strong interference occurs between the broad beam and the narrow beam. Therefore, a corresponding resource allocation mechanism is proposed in Embodiment 3 to avoid occurrence of strong interference between the broad beam and the narrow beam.

A resource allocation mechanism is proposed in Embodiment 3, where the mechanism mainly includes:

1. A narrow beam is not used to perform downlink data transmission on a time-frequency resource occupied by downlink data transmitted by using a broad beam; and the broad beam is not used to perform downlink data transmission on a time-frequency resource occupied by downlink data transmitted by using the narrow beam. That is, time-frequency resources occupied by downlink data separately transmitted by using the broad beam and the narrow beam are staggered.

2. The time-frequency resources occupied by the downlink data separately transmitted by using the broad beam and the narrow beam may be staggered in a manner of time division multiplexing (TDM) or frequency division multiplexing (FDM).

3. Downlink data transmission between narrow beams is performed in a manner of space division multiplexing, and different narrow beams may be used to perform, by using a same time-frequency resource, data transmission for UEs served by the narrow beams.

According to the foregoing mechanism, it is assumed that a broad beam Beam 0 transmitted by the base station is used to transmit data to UE 0; and at the same time, a narrow beam Beam 1 transmitted by the base station is used to transmit data to UE 1, and a narrow beam Beam 2 transmitted by the base station is used to transmit data to UE 2, then, when time-frequency resources occupied by downlink data separately transmitted by using the broad beam and narrow beams are staggered in an FDM manner, on one hand, it may be that only the broad beam is used to transmit downlink data to the UE 0 on several resource blocks RBs (Resource Block) in a same subframe, and none of the narrow beams is used to perform downlink data transmission on these RBs; on the other hand, only the narrow beams are used to perform downlink data transmission on other several RBs different from the foregoing several RBs in the subframe, that is, the narrow beam Beam 1 and the narrow beam Beam 2 respectively transmit data to the UE 1 and the UE 2, and the broad beam Beam 0 is not used to perform downlink data transmission on these RBs.

It should be noted that an RB occupied by downlink data transmitted by using the broad beam may be determined according to a channel state report fed back by the UE 0 by measuring a CRS sent by using the broad beam. Similarly, an RB occupied by downlink data transmitted by using the narrow beam Beam 1 may be determined according to a channel state report fed back by the UE 1 by measuring a first CSI-RS sent by using the narrow beam Beam 1; and an RB occupied by downlink data transmitted by using the narrow beam Beam 2 may be determined according to a channel state report fed back by the UE 2 by measuring a second CSI-RS sent by using the narrow beam Beam 2.

In Embodiment 3, downlink data transmitted on the broad beam and the narrow beams may be uniformly modulated and transmitted by a centralized baseband system. In addition, a manner of staggering the time-frequency resources occupied by the downlink data separately transmitted by using the broad beam and the narrow beams may be adjusted dynamically. Specifically, regardless of whether to stagger the time-frequency resources occupied by the downlink data separately transmitted by using the broad beam and the narrow beams in a TDM manner or in an FDM manner, RBs occupied by the downlink data separately transmitted by using the broad beam and the narrow beams may be adjusted dynamically.

Embodiment 4

Embodiment 4 proposes, mainly for a case in which multiple narrow beams are used to transmit data to a same UE, an implementation manner about how to enable the multiple narrow beams used to transmit data to the UE to cooperatively perform transmission, thereby reducing mutual interference between these narrow beams.

Specifically, the narrow beams used to transmit data to the UE may be used to send same downlink data to the UE on a same RB.

Alternatively, a narrow beam transmitted by using an antenna for which quality of a downlink channel to the UE is best may also be selected from all narrow beams used to transmit data to the UE and according to a channel state report obtained by the UE by measuring a CSI-RS received by the UE, so as to be used to perform downlink data transmission for the UE. Another narrow beam not selected in the narrow beams used to transmit data to the UE may no longer be used to perform any downlink data transmission on an RB used to send the downlink data.

It can be learned, according to the foregoing four actual specific implementation manners of the solution provided in this embodiment of the present invention, that by using the solution provided in this embodiment of the present invention, it can be implemented, on a basis that no adjustment is performed on existing antennas of a base station, that a sector is jointly covered by using narrow beams and a broad beam, and therefore, a system capacity may be improved under a premise that a coverage relationship between sectors is not affected, and in addition, neither an additional standardization process nor UE updating is required.

Figure 6:
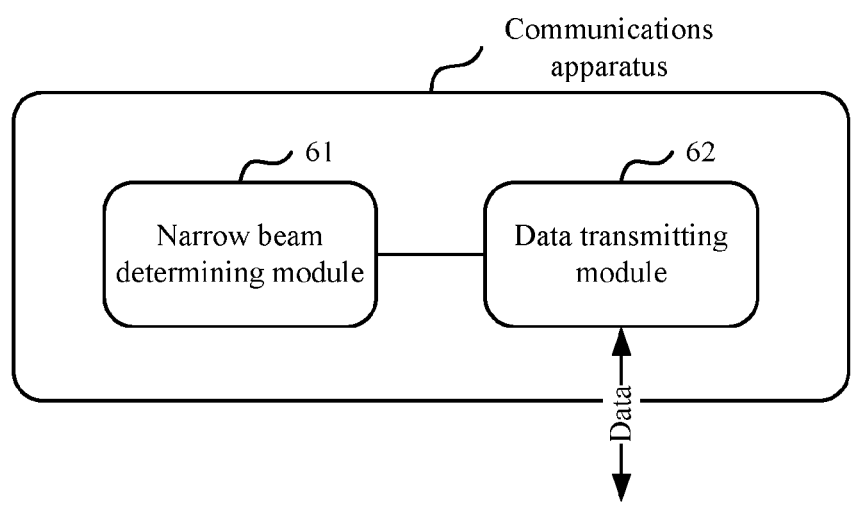
FIG. 6 is a specific schematic structural diagram of a communications apparatus according to an embodiment of the present invention.

Based on an inventive concept the same as that of the communication method provided in the embodiments of the present invention, an embodiment of the present invention further provides a communications apparatus. The communications apparatus may transmit a broad beam and at least two narrow beams. Specifically, a schematic structural diagram of the apparatus is shown in FIG. 6, and the apparatus mainly includes:

a narrow beam determining module 61, configured to determine that at least two narrow beams are used to transmit data to at least two terminals; and a data transmitting module 62, configured to transmit data to the at least two terminals on a same time-frequency resource by using the narrow beams determined by the narrow beam determining module 61.

The broad beam covers a sector of the communications apparatus, coverage areas of the narrow beams completely fall within a coverage area of the broad beam, and the broad beam and the narrow beams have a same PCI.

Optionally, to implement that the broad beam is used to serve a terminal, the communications apparatus may further include:

a broad beam determining module, configured to determine that the broad beam is used to transmit data to one or more other terminals different from the at least two terminals; and the data transmitting module 62 is further configured to transmit data to the one or more other terminals by using the broad beam.

Optionally, the data transmitting module 62 may be specifically configured to transmit data to the at least two terminals on a first time-frequency resource by using the determined narrow beams.

Optionally, the data transmitting module 62 may be specifically configured to transmit data to the one or more other terminals on a second time-frequency resource different from the first time-frequency resource by using the broad beam.

To ensure channel quality of a channel on which transmission is performed by using the determined broad beam used to transmit data to each terminal of the one or more other terminals, optionally, the broad beam determining module may be specifically divided into the following submodules:

a signal receiving submodule, configured to separately receive, by using an antenna used to transmit the broad beam and antennas used to transmit the narrow beams, a first sounding reference signal SRS sent by each terminal of the one or more other terminals;

a channel quality determining submodule, configured to determine, according to a signal strength value of the first SRS that is sent by each terminal of the one or more other terminals and that is separately received by using the antenna used to transmit the broad beam and the antennas used to transmit the narrow beams, channel quality of a channel that is from the antenna used to transmit the broad beam and to each terminal of the one or more other terminals and channel quality of channels that are from the antennas used to transmit the narrow beams and to each terminal of the one or more other terminals; and a broad beam determining submodule, configured to: when it is obtained, by means of comparison, that the channel quality of the channel that is from the antenna used to transmit the broad beam and to each terminal of the one or more other terminals is better than the channel quality of the channels that are from the antennas used to transmit the narrow beams and to each terminal of the one or more other terminals, determine that the broad beam is used to transmit data to each terminal of the one or more other terminals.

To accurately determine the channel quality of the channel that is from the antenna used to transmit the broad beam and to each terminal of the one or more other terminals and the channel quality of the channels that are from the antennas used to transmit the narrow beams and to each terminal of the one or more other terminals, optionally, the channel quality determining submodule may be specifically configured to: correct, according to a correction value that is for the signal strength value and that is separately preset for the antenna used to transmit the broad beam and the antennas used to transmit the narrow beams, the signal strength value of the first SRS that is sent by each terminal of the one or more other terminals and that is separately received by using the antenna used to transmit the broad beam and the antennas used to transmit the narrow beams, so as to obtain each corrected signal strength value of the first SRS; and determine, according to each corrected signal strength value of the first SRS, the channel quality of the channel that is from the antenna used to transmit the broad beam and to each terminal of the one or more other terminals and the channel quality of the channels that are from the antennas used to transmit the narrow beams and to each terminal of the one or more other terminals.

Optionally, to ensure the channel quality of the channels on which transmission is performed by using the determined narrow beams used to transmit data to each terminal of the at least two terminals, the narrow beam determining module 61 may specifically include:

a signal receiving submodule, configured to separately receive, by using the antenna used to transmit the broad beam and the antennas used to transmit the narrow beams, a second SRS sent by each terminal of the at least two terminals;

a channel quality determining submodule, configured to determine, according to a signal strength value of the second SRS that is sent by each terminal of the at least two terminals and that is separately received by using the antenna used to transmit the broad beam and the antennas used to transmit the narrow beams, channel quality of a channel that is from the antenna used to transmit the broad beam and to each terminal of the at least two terminals and channel quality of channels that are from the antennas used to transmit the narrow beams and to each terminal of the at least two terminals; and a narrow beam determining submodule, configured to determine that the narrow beams are used to transmit data to each terminal of the at least two terminals, when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals.

To accurately determine the channel quality of the channel that is from the antenna used to transmit the broad beam and to each terminal of the at least two terminals and the channel quality of the channels that are from the antennas used to transmit the narrow beams and to each terminal of the at least two terminals, optionally, the channel quality determining submodule may be specifically configured to:

correct, according to a correction value that is for the signal strength value and that is separately preset for the antenna used to transmit the broad beam and the antennas used to transmit the narrow beams, the signal strength value of the second SRS that is sent by each terminal of the at least two terminals and that is separately received by using the antenna used to transmit the broad beam and the antennas used to transmit the narrow beams, so as to obtain each corrected signal strength value of the second SRS; and determine, according to each corrected signal strength value of the second SRS, the channel quality of the channel that is from the antenna used to transmit the broad beam and to each terminal of the at least two terminals and the channel quality of the channels that are from the antennas used to transmit the narrow beams and to each terminal of the at least two terminals.

Optionally, the narrow beam determining submodule may be specifically configured to:

when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals, select a channel with best channel quality from the channels that are from the antennas used to transmit the narrow beams and to each terminal of the at least two terminals; and determine that a narrow beam for selected-channel transmission is used to transmit data to each terminal of the at least two terminals.

To trigger a terminal to test a channel state and feed back a channel state report, optionally, the communications apparatus further includes:

a reference signal sending module, configured to: send a cell-specific reference signal CRS by using the broad beam; and separately send a channel state information-reference signal CSI-RS by using each narrow beam transmitted by the communications apparatus and according to the channel state information-reference signal CSI-RS separately preset for each narrow beam transmitted by the communications apparatus, where CSI-RSs set for different narrow beams are different from each other.

Optionally, the data transmitting module 62 may be specifically configured to:

separately perform the following operations on each terminal of the at least two terminals: notifying the terminal of a resource configuration index of a CSI-RS set for a narrow beam used to transmit data to the terminal, and obtaining a corresponding channel state report fed back by the terminal by measuring the CSI-RS;

determine the first time-frequency resource according to a channel state report separately fed back to the communications apparatus by the at least two terminals; and transmit data to the at least two terminals on the first time-frequency resource by using the determined narrow beams.

Optionally, the data transmitting module 62 may be specifically configured to:

obtain channel state reports fed back to the communications apparatus by the one or more other terminals by measuring the CRS received by the one or more other terminals;

determine the second time-frequency resource according to the channel state reports; and transmit data to the one or more other terminals on the second time-frequency resource by using the determined broad beam.

It can be understood that for implementation and interaction manners of modules in this embodiment of the present invention, reference may be further made to a related description in the method embodiments.

The foregoing communications apparatus provided in this embodiment of the present invention may transmit, at the same time, a broad beam that covers a sector of the communications apparatus and narrow beams whose coverage areas completely fall within a coverage area of the broad beam, which implements that under a premise that a coverage area of the sector of the communications apparatus maintains unchanged by using the broad beam, enhanced coverage of the sector is further achieved by using the narrow beams, thereby improving spectral efficiency. In the solutions, a sector coverage area of the broad beam transmitted by the communications apparatus still maintains unchanged, and therefore, a coverage relationship between sectors is not affected. In addition, neither an additional site backhaul resource nor additional standardization support is required in the solutions.

Figure 7:
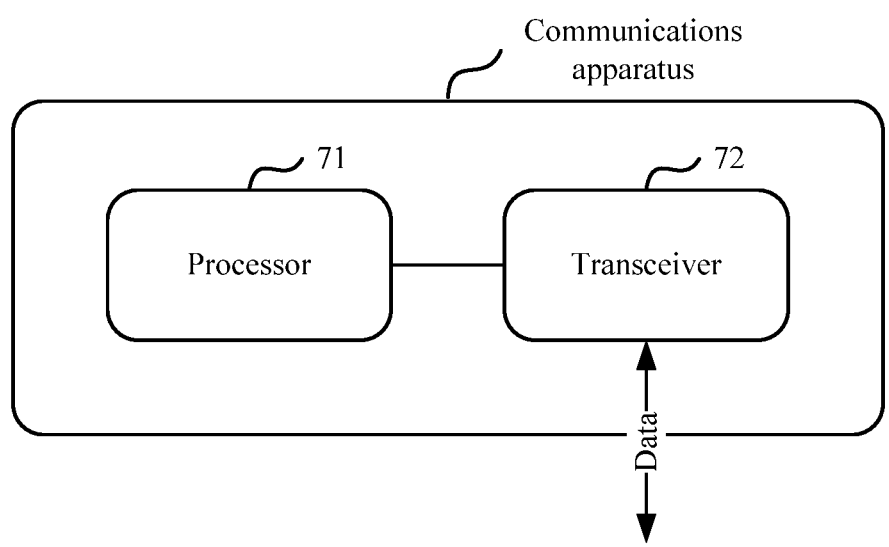
FIG. 7 is a specific schematic structural diagram of another communications apparatus according to an embodiment of the present invention.

Based on an inventive concept the same as that of the communication method provided in the embodiments of the present invention, an embodiment of the present invention further provides another communications apparatus. The communications apparatus may transmit a broad beam and at least two narrow beams. Specifically, a schematic structural diagram of the apparatus is shown in FIG. 7, and the apparatus mainly includes:

a processor 71, configured to determine that at least two narrow beams are used to transmit data to at least two terminals; and a transceiver 72, configured to transmit data to the at least two terminals on a same time-frequency resource by using the narrow beams determined by the processor 71.

The broad beam covers a sector of the communications apparatus, coverage areas of the narrow beams completely fall within a coverage area of the broad beam, and the broad beam and the narrow beams have a same PCI.

Optionally, the processor 71 may be further configured to determine that the broad beam is used to transmit data to one or more other terminals different from the at least two terminals. The transceiver 72 may be further configured to transmit data to the one or more other terminals by using the broad beam.

Optionally, the transceiver 72 may be specifically configured to transmit data to the at least two terminals on a first time-frequency resource by using the determined narrow beams.

Optionally, the transceiver 72 may be specifically configured to transmit data to the one or more other terminals on a second time-frequency resource different from the first time-frequency resource by using the broad beam.

Optionally, the processor 71 may be specifically configured to: determine, according to a first sounding reference signal SRS that is sent by each terminal of the one or more other terminals and that is separately received by the transceiver 72 by using an antenna used to transmit the broad beam and antennas used to transmit the narrow beams, channel quality of a channel that is from the antenna used to transmit the broad beam and to each terminal of the one or more other terminals and channel quality of channels that are from the antennas used to transmit the narrow beams and to each terminal of the one or more other terminals; and when it is obtained, by means of comparison, that the channel quality of the channel that is from the antenna used to transmit the broad beam and to each terminal of the one or more other terminals is better than the channel quality of the channels that are from the antennas used to transmit the narrow beams and to each terminal of the one or more other terminals, determine that the broad beam is used to transmit data to each terminal of the one or more other terminals.

Optionally, the processor 71 may be specifically configured to: correct, according to a correction value that is for the signal strength value and that is separately preset for the antenna used to transmit the broad beam and the antennas used to transmit the narrow beams, the signal strength value of the first SRS that is sent by each terminal of the one or more other terminals and that is separately received by using the antenna used to transmit the broad beam and the antennas used to transmit the narrow beams, so as to obtain each corrected signal strength value of the first SRS; and determine, according to each corrected signal strength value of the first SRS, the channel quality of the channel that is from the antenna used to transmit the broad beam and to each terminal of the one or more other terminals and the channel quality of the channels that are from the antennas used to transmit the narrow beams and to each terminal of the one or more other terminals.

Optionally, the processor 71 may be specifically configured to: determine, according to a signal strength value of a second SRS that is sent by each terminal of the at least two terminals and that is separately received by the transceiver 72 by using an antenna used to transmit the broad beam and antennas used to transmit the narrow beams, channel quality of a channel that is from the antenna used to transmit the broad beam and to each terminal of the at least two terminals and channel quality of channels that are from the antennas used to transmit the narrow beams and to each terminal of the at least two terminals; and determine that the narrow beams are used to transmit data to each terminal of the at least two terminals, when it is obtained, by means of comparison, that the channel quality of the channels that are from the antennas used to transmit the narrow beams and to each terminal of the at least two terminals is better than the channel quality of the channel that is from the antenna used to transmit the broad beam and to each terminal of the at least two terminals.

Optionally, the processor 71 may be specifically configured to: correct, according to a correction value that is for the signal strength value and that is separately preset for the antenna used to transmit the broad beam and the antennas used to transmit the narrow beams, the signal strength value of the second SRS that is sent by each terminal of the at least two terminals and that is separately received by using the antenna used to transmit the broad beam and the antennas used to transmit the narrow beams, so as to obtain each corrected signal strength value of the second SRS; and determine, according to each corrected signal strength value of the second SRS, the channel quality of the channel that is from the antenna used to transmit the broad beam and to each terminal of the at least two terminals and the channel quality of the channels that are from the antennas used to transmit the narrow beams and to each terminal of the at least two terminals.

Optionally, the processor 71 may be specifically configured to: select a channel with best channel quality from the channels that are from the antennas used to transmit the narrow beams and to each terminal of the at least two terminals; and determine that a narrow beam for selected-channel transmission is used to transmit data to each terminal of the at least two terminals.

Optionally, the transceiver 72 may be further configured to: send a cell-specific reference signal CRS by using the broad beam; and separately send a channel state information-reference signal CSI-RS by using each narrow beam transmitted by the communications apparatus and according to the channel state information-reference signal CSI-RS separately preset for each narrow beam transmitted by the communications apparatus, where CSI-RSs set for different narrow beams are different from each other.

Optionally, the transceiver 72 may be specifically configured to: separately perform the following operations on each terminal of the at least two terminals: notifying the terminal of a resource configuration index of a CSI-RS set for a narrow beam used to transmit data to the terminal, and obtaining a corresponding channel state report fed back by the terminal by measuring the CSI-RS; and after the at least two terminals separately feed back a channel state report to the communications apparatus, transmit data to the at least two terminals on the first time-frequency resource by using the determined narrow beams. The first time-frequency resource may be determined by the processor 71 according to the foregoing channel state report.

Optionally, the transceiver 72 may be specifically configured to: obtain channel state reports fed back to the communications apparatus by the one or more other terminals by measuring the CRS received by the one or more other terminals; and after the one or more other terminals separately feed back the channel state reports to the communications apparatus, transmit data to the one or more other terminals on the second time-frequency resource by using the determined broad beam. The second time-frequency resource may be determined by the processor 71 according to the channel state reports that are fed back to the communications apparatus by the one or more other terminals by measuring the CRS received by the one or more other terminals.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although some exemplary embodiments of the present application have been described, persons skilled in the art can make changes and modifications to these embodiments once they learn the basic inventive concept. Therefore, the following claims are intended to be construed as covering the exemplary embodiments and all changes and modifications falling within the scope of the present application.

Obviously, persons skilled in the art can make various modifications and variations to the embodiments of the present application without departing from the spirit and scope of the embodiments of the present invention. The present application is intended to cover these modifications and variations provided that they fall within the scope of protection defined by the following claims and their equivalent technologies.

What is claimed is:

1. A communication method, comprising:
   determining, by a base station, that at least two narrow beams are used to transmit data to at least two terminals, wherein the base station transmits a broad beam and the at least two narrow beams;
   transmitting, by the base station, first data to the at least two terminals on a same first time-frequency resource by using the at least two narrow beams determined be used to transmit data to the at least two terminals; and
   determining, by the base station, that the broad beam is used to transmit data to one or more other terminals different from the at least two terminals;
   transmitting, by the base station, second data to the one or more other terminals on a second time-frequency resource different from the first time-frequency resource by using the broad beam;
   sending, by the base station, a cell-specific reference signal (CRS) by using the broad beam; and
   sending, separately, by the base station, channel state information-reference signals (CSI-RSs) using each of the at least two narrow beams transmitted by the base station and according to the respective CSI-RS separately preset for each narrow beam transmitted by the base station, wherein the CSI-RSs preset for different narrow beams are different from each other;
   wherein the broad beam covers a sector of the base station;
   wherein coverage areas of the at least two narrow beams fall within a coverage area of the broad beam; and
   wherein the broad beam and the at least two narrow beams have a same physical cell identifier (PCI).

2. The method according to claim 1, wherein the determining, by the base station, that the broad beam is used to transmit data to the one or more other terminals comprises:
   receiving, separately, by the base station, using an antenna used to transmit the broad beam and antennas used to transmit the at least two narrow beams, a first sounding reference signal (SRS) sent by each terminal of the one or more other terminals;
   determining, according to a first signal strength value of the first SRS that is sent by each terminal of the one or more other terminals and that is separately received by using the antenna used to transmit the broad beam and the antennas used to transmit the at least two narrow beams, a first channel quality of a channel that is from the antenna used to transmit the broad beam and that is to each terminal of the one or more other terminals and determining a second channel quality of channels that are from the antennas used to transmit the at least two narrow beams and that are to each terminal of the one or more other terminals; and
   determining, in response to the first channel quality being better than the second channel quality, that the broad beam is used to transmit data to each terminal of the one or more other terminals.

3. The method according to claim 1, wherein the determining, by a base station, that the at least two narrow beams are used to transmit data to the at least two terminals comprises:
   receiving, separately, by the base station, using an antenna used to transmit the broad beam and antennas used to transmit the at least two narrow beams, a second SRS sent by each terminal of the at least two terminals;
   determining, according to a second signal strength value of the second SRS that is sent by each terminal of the at least two terminals and that is received separately using the antenna used to transmit the broad beam and the antennas used to transmit the at least two narrow beams, a first channel quality of a channel that is from the antenna used to transmit the broad beam and to each terminal of the at least two terminals and a second channel quality of channels that are from the antennas used to transmit the at least two narrow beams and to each terminal of the at least two terminals; and
   determining, in response to the second channel quality being better than the first channel quality, that the at least two narrow beams are used to transmit data to each terminal of the at least two terminals.

4. The method according to claim 1, wherein the transmitting, by the base station, the first data to the at least two terminals on a same time-frequency resource by using the at least two narrow beams comprises performing at least one of:
   transmitting, by the base station, the first data to the at least two terminals on the same time-frequency resource by using the at least two narrow beams, wherein the first data is transmitted to different terminals of the at least two terminals separately by using different narrow beams; or
   transmitting, by the base station, the first data to the at least two terminals on the same time-frequency resource by using the at least two narrow beams, wherein the first data is transmitted to a same one of the at least two terminals by using at least two narrow beams.

5. A communications apparatus, comprising:
   a transceiver configured to transmit a broad beam and at least two narrow beams; and
   a processor connected to the transceiver, the processor configured to determine that the at least two narrow beams are used to transmit data to at least two terminals, wherein the processor is further configured to determine that the broad beam is used to transmit data to one or more other terminals different from the at least two terminals;
   wherein the transceiver is further configured to transmit first data to the at least two terminals on a same time-frequency resource by using the at least two narrow beams determined to be used to transmit data to the at least two terminals;
   wherein the transceiver is further configured to:
      transmit data to the one or more other terminals by using the broad beam and transmit data to the at least two terminals on a first time-frequency resource by using the at least two narrow beams;
      transmit second data to the one or more other terminals on a second time-frequency resource different from the first time-frequency resource by using the broad beam;

send a cell-specific reference signal (CRS) by using the broad beam; and send, separately, a channel state information-reference signal (CSI-RS) by using each of the at least two narrow beams and according to the respective CSI-RS separately preset for each transmitted narrow beam of the at least two narrow beams, wherein CSI-RSs set for different ones of the at least two narrow beams are different from each other;

wherein the broad beam covers a sector of the communications apparatus;

wherein coverage areas of the at least two narrow beams fall within a coverage area of the broad beam; and wherein the broad beam and the at least two narrow beams have a same physical cell identifier (PCI).

6. The apparatus according to claim 5, wherein the processor is further configured to:

receive, separately, by using an antenna used to transmit the broad beam and antennas used to transmit the at least two beams, a first sounding reference signal (SRS) sent by each terminal of the one or more other terminals;

determine, according to a first signal strength value of the first SRS that is sent by each terminal of the one or more other terminals and that is separately received by using the antenna used to transmit the broad beam and the antennas used to transmit the at least two narrow beams, a first channel quality of a channel that is from the antenna used to transmit the broad beam and that is to each terminal of the one or more other terminals and a second channel quality of channels that are from the antennas used to transmit the at least two narrow beams and that are to each terminal of the one or more other terminals; and determine that the broad beam is used to transmit data to each terminal of the one or more other terminals in response to the first channel quality being better than the second channel quality.

7. The apparatus according to claim 6, wherein the processor is further configured to:

correct the first signal strength value according to a correction value that is for the first signal strength value and that is separately preset for the antenna used to transmit the broad beam and the antennas used to transmit the at least two narrow beams, so as to obtain a corrected signal strength value of the first SRS; and determine, according to each corrected signal strength value of the first SRS, the first channel quality of the channel that is from the antenna used to transmit the broad beam and that is to each terminal of the one or more other terminals and the second channel quality of the channels that are from the antennas used to transmit the at least two narrow beams and that are to each terminal of the one or more other terminals.

8. The apparatus according to claim 5, wherein the processor is further configured to:

receive, separately, by using an antenna used to transmit the broad beam and antennas used to transmit the at least two narrow beams, a second SRS sent by each terminal of the at least two terminals;

determine, according to a second signal strength value of the second SRS that is sent by each terminal of the at least two terminals and that is separately received by using the antenna used to transmit the broad beam and the antennas used to transmit the at least two narrow beams, a first channel quality of a channel that is from the antenna used to transmit the broad beam and to each terminal of the at least two terminals and a second channel quality of channels that are from the antennas used to transmit the at least two narrow beams and to each terminal of the at least two terminals; and determine that the at least two narrow beams are used to transmit data to each terminal of the at least two terminals, in response to the second channel quality being better than the first channel quality.

9. The apparatus according to claim 8, wherein the transceiver is further configured to perform at least one of:

transmit, the first data to the at least two terminals on a same time-frequency resource by using the at least two narrow beams, wherein the first data is transmitted separately to different terminals of the at least two terminals by using different narrow beams; or transmit the first data to the at least two terminals on the same time-frequency resource by using the at least two narrow beams, wherein the first data is transmitted to a same terminal by using the at least two narrow beams.

10. The apparatus according to claim 5, wherein the transceiver is further configured to:

separately perform the following operations on each terminal of the at least two terminals:

notify the terminal of a resource configuration index of a CSI-RS set for a one of the at least two narrow beams used to transmit data to the terminal, and obtain a corresponding channel state report fed back by the terminal by measuring the CSI-RS;

determine the first time-frequency resource according to a channel state report separately fed back to the apparatus by the at least two terminals; and transmit the first data to the at least two terminals on the first time-frequency resource by using the at least two narrow beams.

11. The apparatus according to claim 5, wherein the transceiver is further configured to:

obtain channel state reports fed back by the one or more other terminals by measuring the CRS received by the one or more other terminals;

determine the second time-frequency resource according to the channel state reports; and transmit the second data to the one or more other terminals on the second time-frequency resource by using the broad beam.

12. A non-transitory computer-readable medium comprising instructions that, when executed, cause an apparatus to:

determine, that at least two narrow beams are used to transmit data to at least two terminals, wherein a base station transmits a broad beam and at the least two narrow beams; and transmit first data to the at least two terminals on a same time-frequency resource by using the at least two narrow beams, wherein the instructions that cause the apparatus to transmit the first data to the at least two terminals comprise instructions that, when executed, cause the apparatus to:

transmit the first data to the at least two terminals on a first time-frequency resource by using the at least two narrow beams;

determine that the broad beam is used to transmit data to one or more other terminals different from the at least two terminals;

transmit second data to the one or more other terminals on a second time-frequency resource different from the first time-frequency resource by using the broad beam;

send a cell-specific reference signal (CRS) by using the broad beam; and send, separately, channel state information-reference signals (CSI-RSs) using each of the at least two narrow beams and according to the respective CSI-RS separately preset for each narrow beam, wherein the CSI-RSs preset for different narrow beams are different from each other;

wherein the broad beam covers a sector;

wherein coverage areas of the narrow beams completely fall within a coverage area of the broad beam; and wherein the broad beam and the at least two narrow beams have a same physical cell identifier (PCI).

* * * * *